(12) United States Patent
Haghighat et al.

(10) Patent No.: US 9,171,103 B2
(45) Date of Patent: Oct. 27, 2015

(54) CONCURRENT INSERTION OF ELEMENTS INTO DATA STRUCTURES

(71) Applicant: Intel Corporation, Santa Clara, CA (US)

(72) Inventors: Mohammad R. Haghighat, San Jose, CA (US); Knud J. Kirkegaard, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/036,607

(22) Filed: Sep. 25, 2013

(65) Prior Publication Data

US 2014/0025709 A1     Jan. 23, 2014

Related U.S. Application Data

(62) Division of application No. 10/685,070, filed on Oct. 13, 2003, now Pat. No. 8,549,043.

(51) Int. Cl.
     *G06F 17/30*      (2006.01)
     *G06F 9/52*      (2006.01)
     *G06F 9/30*      (2006.01)

(52) U.S. Cl.
CPC ........ *G06F 17/30958* (2013.01); *G06F 9/3004* (2013.01); *G06F 9/30021* (2013.01); *G06F 9/30087* (2013.01); *G06F 9/52* (2013.01); *G06F 9/526* (2013.01); *G06F 17/30348* (2013.01)

(58) Field of Classification Search
CPC ... G06F 17/18; G06F 11/006; G06F 11/3672; G06F 17/30336; G06F 17/30607; G06F 21/552; G06F 9/4881; G06F 9/5016; G06F 9/526
USPC .......... 707/800, 769, 802, 812, 100, 101, 102
See application file for complete search history.

(56) References Cited

U.S. PATENT DOCUMENTS

| | | | |
|---|---|---|---|
| 5,924,098 | A | 7/1999 | Kluge |
| 6,173,442 | B1 | 1/2001 | Agesen et al. |
| 6,247,025 | B1 | 6/2001 | Bacon |
| 6,510,437 | B1 | 1/2003 | Bak et al. |
| 6,581,063 | B1 * | 6/2003 | Kirkman ............... 707/999.1 |
| 6,615,216 | B1 * | 9/2003 | Hu ..................... 707/999.009 |
| 6,651,146 | B1 * | 11/2003 | Srinivas et al. ............ 711/150 |
| 6,735,760 | B1 | 5/2004 | Dice |

(Continued)

OTHER PUBLICATIONS

V. Luchangco et al., "Nonblocking k-compare-single-swap". In Proceedings of the 15th Annual ACM Symposium on Parallel Architectures and Algorithms, San Diego, California, 2003, 10 pages.

(Continued)

*Primary Examiner* — Jay Morrison
*Assistant Examiner* — Dangelino Gortayo
(74) *Attorney, Agent, or Firm* — Trop, Pruner & Hu, P.C.

(57) ABSTRACT

A method of adding an element to a data structure may include atomically associating the element with the data structure if the element is not associated with the data structure. The element may be prepared for insertion into a location in the data structure. The method may also include atomically inserting the element into the location in the data structure if another element has not been inserted into the location.

14 Claims, 5 Drawing Sheets

(56) References Cited

U.S. PATENT DOCUMENTS

| | | | |
|---|---|---|---|
| 6,772,153 B1 | 8/2004 | Bacon et al. | |
| 6,826,757 B2 | 11/2004 | Steele et al. | |
| 6,862,635 B1 | 3/2005 | Alverson et al. | |
| 6,965,905 B2 | 11/2005 | Garthwaite | |
| 6,988,180 B2 | 1/2006 | Kadatch | |
| 6,993,770 B1 | 1/2006 | Detlefs et al. | |
| 7,117,502 B1 | 10/2006 | Harris | |
| 7,254,597 B2 * | 8/2007 | Moir et al. | 707/999.202 |
| 7,539,849 B1 * | 5/2009 | Shavit et al. | 712/202 |
| 2003/0233393 A1 * | 12/2003 | Li | 709/107 |
| 2004/0107227 A1 * | 6/2004 | Michael | 707/206 |
| 2004/0181504 A1 | 9/2004 | Chang et al. | |

OTHER PUBLICATIONS

Valois, John D., "Implementing Lock-Free Queues", Proceedings of the Seventh International Conference on Parallel and Distributed Computing Systems, Las Vegas, Nevada (Oct. 1994).

Valois, John D., "Lock-Free Linked Lists Using Compare-and-Swap", Proceedings of the 14th Annual ACM Symposium on Principles of Distributed Computing, Ottawa, Ontario, Canada (Aug. 1995).

Huang, Hai et al., "Improving Wait-Free Algorithms for Interprocess Communication in Embedded Real-Time Systems", Real-Time Computing Laboratory, Department of Electrical Engineering and Computer Science, The University of Michigan, Ann Arbor, MI (2002).

Fober, Dominique et al., "Lock-Free Techniques for Concurrent Access to Shared Objects", Actes des Journe'es d'Informatique Musicale JIM2002, Marseille, France (May 2002).

Michael, Maged M., "Safe Memory Reclamation for Dynamic Lock-Free Objects Using Atomic Reads and Writes", Proceedings of the 21st Annual ACM Symposium on Principles of Distributed Computing, Monterey, California (Jul. 2002).

\* cited by examiner

```
1.   void addElement (eType* e)
2.   {
3.     if (next (e)) return;
4.
5.     if (CompareAndExchange (&next (e), e, 0) != 0) {
6.         return;
7.     }
8.     while (1) {
9.         next (e) = list;
10.        if (CompareAndExchange (&list, e, next (e)) == next (e)) {
11.            return;
12.        }
13.    }
14.  }
```

Fig. 5

CONCURRENT INSERTION OF ELEMENTS INTO DATA STRUCTURES

This application is a divisional of U.S. patent application Ser. No. 10/685,070, filed Oct. 13, 2003, the content of which is hereby incorporated by reference.

BACKGROUND

The claimed invention relates to concurrent data processing and, more particularly, to concurrent data processing involving a shared resource.

For some time, computing environments have been available that support multithreading, which enables programs whose parts may execute concurrently. Such parts of a program that may execute independently of other parts are typically referred to as "threads." Examples of computing environments that may support concurrent (e.g., parallel) execution of threads may include operating systems, compilers, virtual machines, run-time systems, and just-in-time (JIT) compilers.

In some situations, multiple threads may want to perform different operations on the same data element and/or data structure (i.e., a shared resource). To handle such instances, multithreaded computing environments typically include one or more synchronization mechanisms for synchronizing parallel activities of threads. One example of such a synchronization mechanism that may be provided (e.g., via an application programming interface (API) or other interface) is a "lock" that allows exclusive use of the shared resource for a certain time by a particular thread. In such a case, a thread may acquire a lock, perform one or more operations that need to be mutually exclusive, and release the lock after performing the operation(s). The computing environment may ensure that only one thread at a time can acquire a lock, regardless of other threads also trying to acquire a lock.

Such locking synchronization mechanisms, however, may require a substantial amount of overhead for associated system calls (e.g., for keeping track of which threads own which locks and/or the states of locks). This overhead may be large enough to impact performance if the locks are used in performance-critical code. Also, these locking mechanisms may not be tolerant of faults. For example, if a thread that has acquired a lock dies (e.g., is killed or exits abnormally) before releasing its lock, other threads may be prevented from accessing the shared resources protected by that unreleased lock. Further, if a thread that owns a lock is suspended, a "deadlock" may occur if the resumption of the suspended thread is dependent on the completion of another task whose progress, in turn, is dependent on the lock of the suspended thread.

BRIEF DESCRIPTION OF THE DRAWINGS

The accompanying drawings, which are incorporated in and constitute a part of this specification, illustrate one or more implementations consistent with the principles of the invention and, together with the description, explain such implementations. In the drawings.

FIG. 5 illustrates one implementation of the process of FIG. 2 consistent with the principles of the invention.

DETAILED DESCRIPTION

The following detailed description refers to the accompanying drawings. The same reference numbers may be used in different drawings to identify the same or similar elements. Also, the following detailed description illustrates certain implementations and principles, but the scope of the claimed invention is defined by the appended claims and equivalents.

During the execution of a program, it may be desirable to collect a list of items that have certain properties. Typically, this is done using a global dynamic structure, such as a linked list or a stack. Upon observing an item that meets certain criteria (e.g., upon activation of a program function), a routine may be called to add the item (e.g., a pointer to the function information) to the list. If the program is multithreaded, multiple threads may try to add items to the list simultaneously.

Although the following description may primarily describe adding elements to a linked list, it should be noted that other types of data structures and operations may be implemented consistent with the principles of the invention. For example, data structures such as stacks, queues, sets, doubly-linked lists, database data structures, etc. may be implemented consistent with the principles of the invention as described herein. Nor is the claimed invention limited to the operation of adding an element to a data structure. Rather, the principles described and claimed herein are applicable to a range of scenarios where there may be competition for and/or contention over a shared resource among threads.

Figure 1:
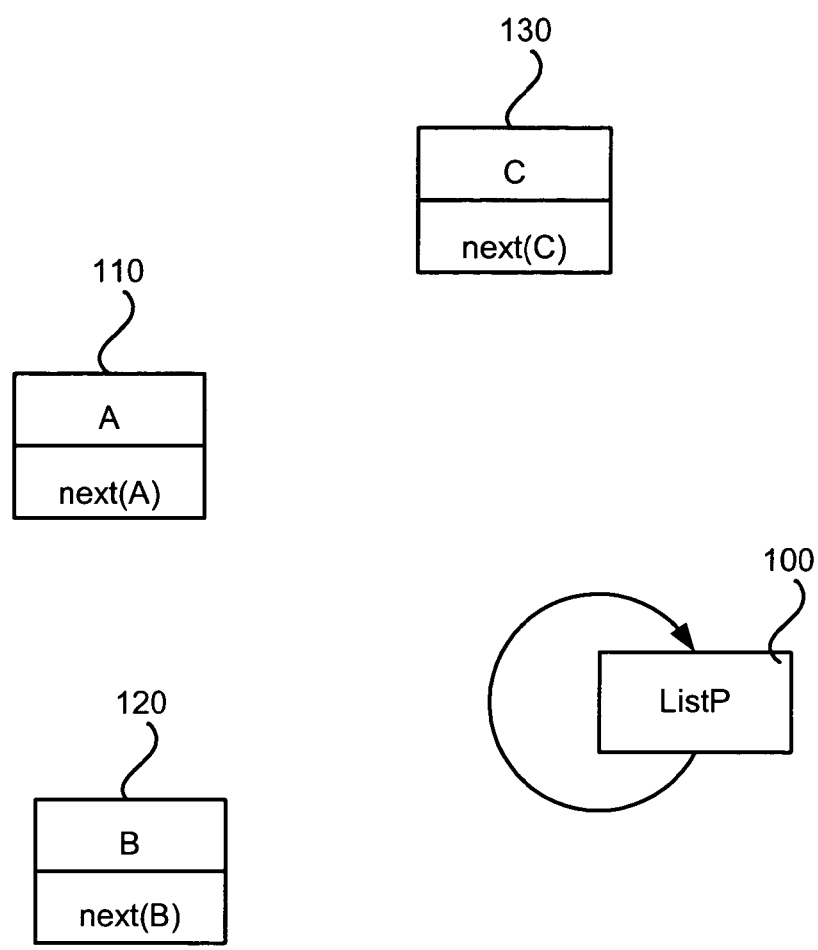
FIG. 1 illustrates an exemplary initialized list and data elements consistent with the principles of the invention.

FIG. 1 illustrates an exemplary initialized list 100 and data elements 110-130 consistent with the principles of the invention. List 100 may initially include a pointer, ListP, that points to itself (e.g., the value of ListP is the location of ListP). As elements are added to list 100, ListP may point to the first element in list 100, and the last element in list 100 may point to ListP. Thus, list 100 may be considered circular, and may be completely traversed when ListP is reached from an element in list 100.

Data elements 110-130 may include a data portion (denoted by letters A-C) and a pointer (denoted by next(A-C)). Although only three data elements 110-130 are illustrated for ease of explanation, many more elements may be present. The data portions may include data of possibly various types. The pointer, next(A) for example, may point to another element, if data element 110 is part of list 100.

When data elements 110-130 are initialized, their respective pointers next(A), next(B), and next(C) may be given a null value (or some other predetermined, known value) to indicate that elements 110-130 are not initially part of list 100. Thus initialized, any of elements 110-130 may be checked to decide whether that element belongs to list 100. If next(A) is null, for example, then element 110 is not part of list 100, otherwise, element 110 may be part of list 100. Thus, pointers next(A-C) of elements 110-130 may perform the dual functions of indicating whether a particular element has been added to list 100 and linking together elements once added to list 100.

Figure 2:
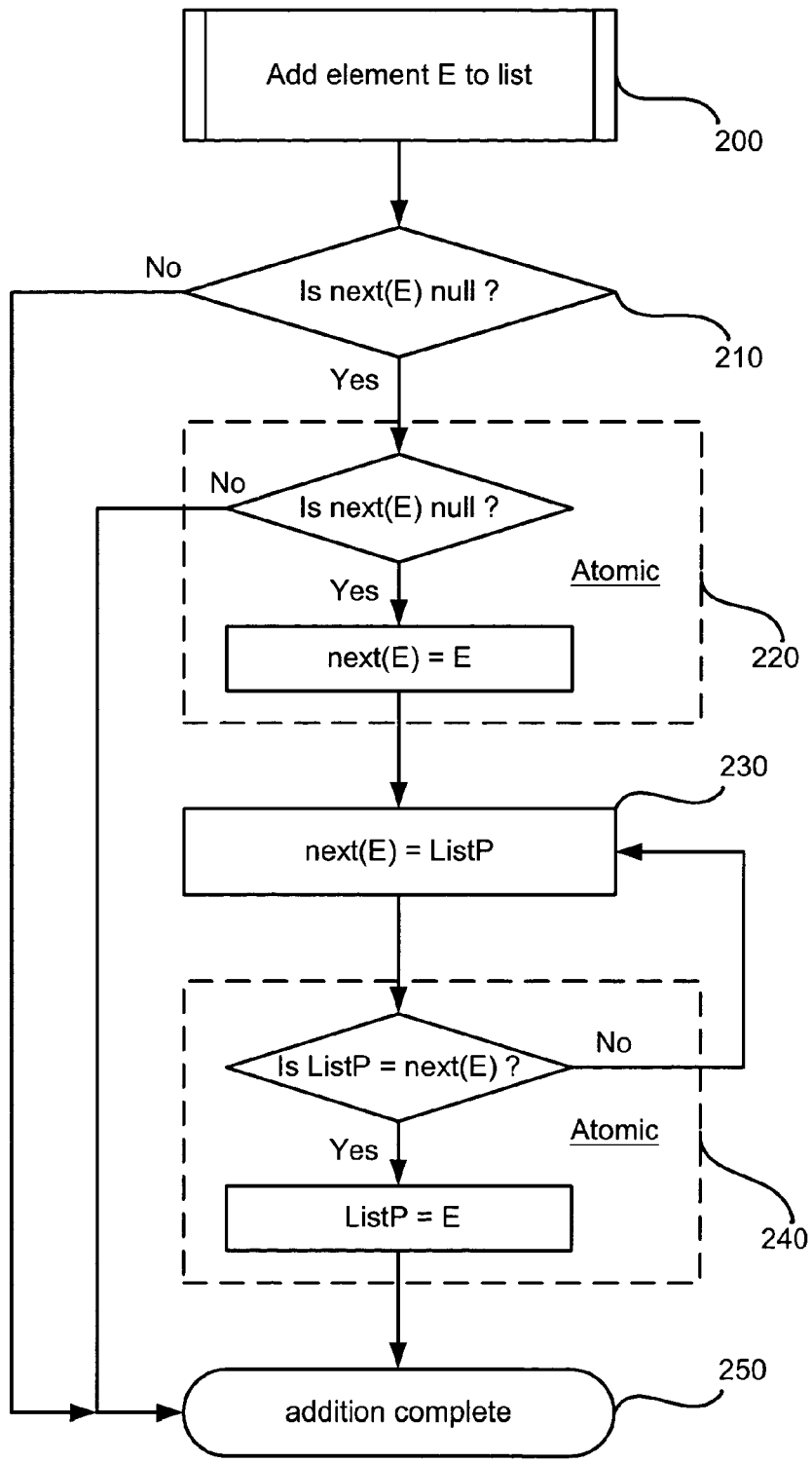
FIG. 2 is a flow chart illustrating a process of adding an element to a list according to an implementation consistent with the principles of the invention.
Figure 3:
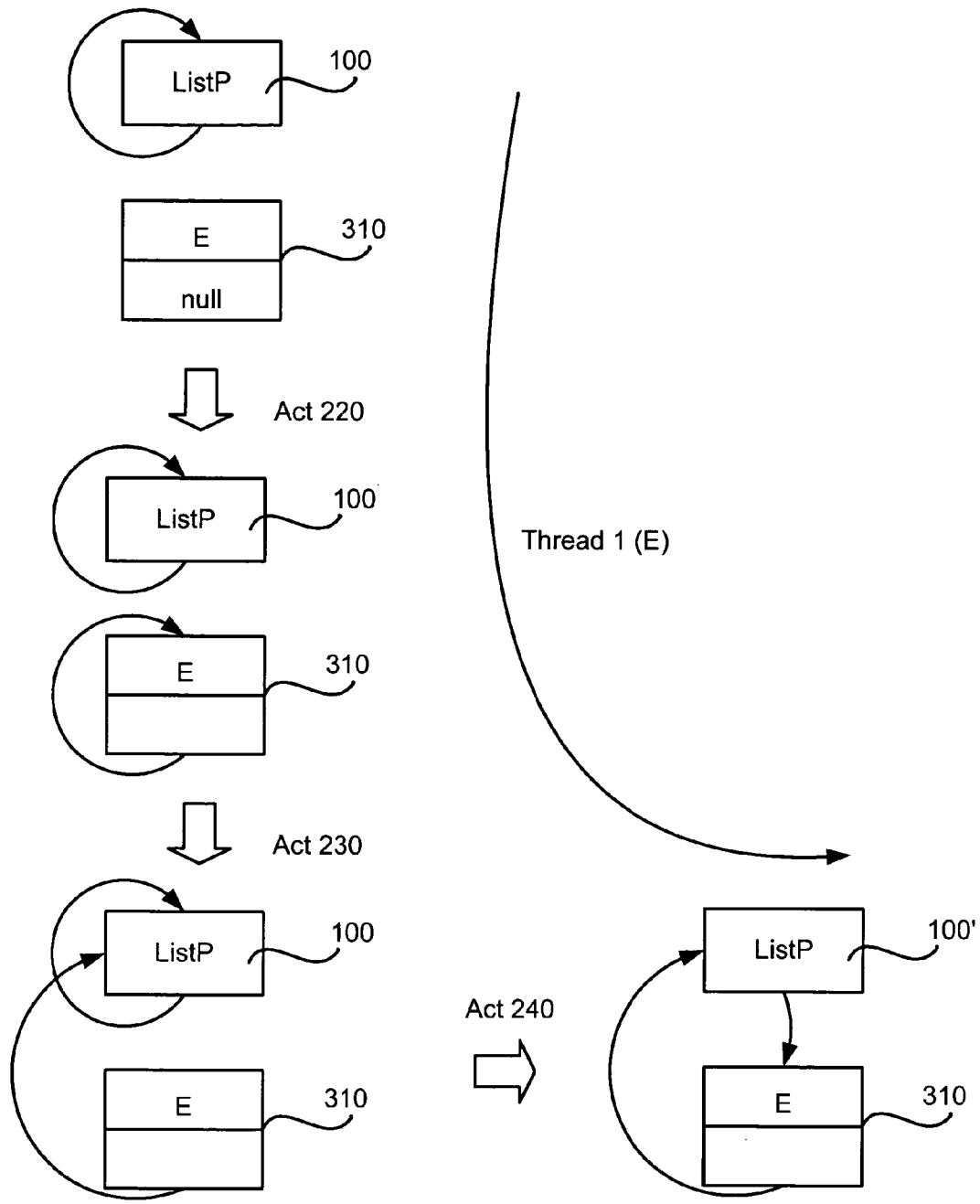
FIG. 3 illustrates operation of the process of FIG. 2 for a single thread according to an implementation consistent with the principles of the invention.

FIG. 2 is a flow chart illustrating a process 200 of adding an element E to a list according to an implementation consistent with the principles of the invention. FIG. 2 will initially be described in conjunction with FIG. 3 for a single-thread scenario. FIG. 3 illustrates operation of process 200 for a single Thread 1 adding an element E to list 100 according to an implementation consistent with the principles of the invention.

Processing may begin with the thread determining whether the pointer next(E) of the element to be added E is null [act 210]. This determination may conclude process 200 at act 250 if element E is already present in list 100 (i.e., next(E) is not null). Act 210 may enforce a condition that an element E may appear in list 100 only once, and may efficiently determine whether element 310 is already in list 100 before performing other acts in process 200. Because element 310 has a null pointer value in FIG. 3, the decision in act 210 is affirmative and not explicitly illustrated.

If the pointer next(E) of the element to be added E is null, process 200 may continue with the thread executing a first atomic operation [act 220]. As used herein, an "atomic" operation may be defined as an operation and/or software primitive that is uninterruptible by another thread (e.g., this may be conceptualized as an apparently instantaneous or uninterruptible/indivisible operation—hence the "atomic" label). Atomic act 220 may perform a "compare-and-exchange" type operation to replace the pointer next(E) of element 310 with its address E if next(E) is initially null. Such operations will be described in greater detail below. Like act 210, act 220 may conclude process 200 at act 250 if next(E) is not null. As illustrated in FIG. 3, for the single Thread 1, atomic act 220 may result in element 310 pointing to itself, indicating that it is associated with list 100.

Process 200 may continue with the thread modifying the pointer next(E) of element E to point to the value of ListP [act 230]. As illustrated in FIG. 3, act 230 causes the pointer next(E) of element 310 to point to the same location as ListP. In the example of FIG. 3 where list 100 initially includes no elements, the value of ListP and next(E) may be the head of list 100, but in other cases, next(E) would be modified by act 230 to point to the first element in list 100.

Process 200 may continue with the thread executing a second atomic, compare-and-exchange type operation [act 240]. Atomic act 240 may replace the value of ListP with the address E of element 310 if the values of ListP and next(E) are initially equal. As illustrated in FIG. 3, for the single Thread 1 atomic act 240 may result in ListP pointing to element 310, because no other threads have changed the value of value of ListP before act 240.

As will be explained in a multiple-thread example below, the values of ListP and next(E) may not necessarily be equal in act 240, despite assigning ListP to next(E) in the previous act 230, due to interference from other threads. In such a case, where the values of ListP and next(E) are not equal in act 240, process 200 may repeat acts 230 and 240 until element E is added to list 100, as illustrated in FIG. 2.

Process 200 may conclude with act 250, a return from the adding routine. As illustrated in FIG. 2, act 250 may be reached from acts 210, 220, and 240. In acts 210 and 220, the thread may reach act 250 when it has been unable to add element E to list 100. Thus, addition process 200 may be considered "completed" even when element E has not been added to list 100. By contrast, the thread may reach act 250 from act 240 upon successful addition of element E to list 100.

Figure 4:
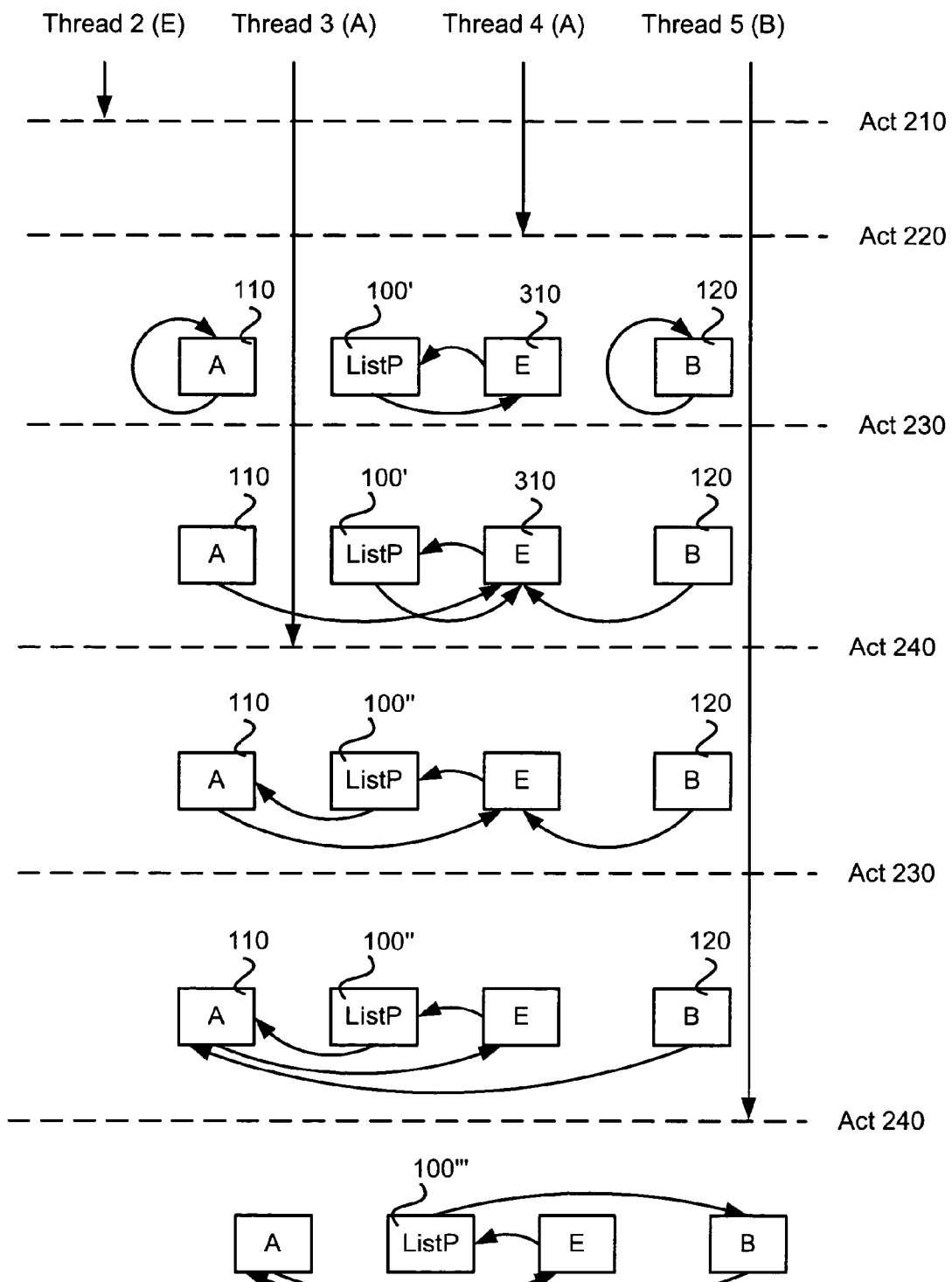
FIG. 4 illustrates operation of the process of FIG. 2 for a multiple threads according to an implementation consistent with the principles of the invention.

FIG. 4 illustrates operation of process 200 for a multiple threads, Threads 2-5, attempting to add various elements to list 100' according to an implementation consistent with the principles of the invention. In FIG. 4, Thread 2 seeks to add element E, 310; Threads 3 and 4 both seek to add element A, 110; and Thread 5 seeks to add element B, 120. Also in FIG. 4, list 100' may exist as at the bottom of FIG. 3, including one element 310. Elements 110 and 120 may have null pointers as described above with respect to the initialization in FIG. 1.

Further, in the example of FIG. 4, Threads 2-5 may execute process 200 nearly concurrently. That is, each of Threads 2-5 may execute act 210, for example, at approximately the same time. When one thread must execute before another (e.g., for atomic acts 220 and/or 240), Thread 2 may be assumed to execute slightly before Thread 3, which in turn executes slightly before Thread 4, which in turn executes slightly before Thread 5. Such an order has been chosen for the purposes of illustration only, and may differ in practice. Similarly, the numbers of threads and elements shown in FIG. 4 are purely exemplary, and may also vary from that shown.

Threads 2-5 may execute act 210. Threads 3-5 may continue beyond act 210, because the respective pointers next(A) and next(B) of elements 210 and 220 are null. Thread 2 may return/exit from process 200, because it seeks to add element 310 that is already present in list 100' (e.g., having a non-null pointer next(E)). Such returning/exiting from process 200 is illustrated in FIG. 4 by Thread 2's arrow stopping at act 210.

Continuing in process 200, Thread 3 may execute atomic act 220, causing the pointer next(A) of element 110 to point to its address. Because Thread 4 cannot execute atomic act 220 concurrently with Thread 3 or otherwise interrupt Thread 3's execution of atomic act 220, Thread 4 may execute act 220 slightly afterward. Thread 4 may find in act 220 that next(A) of element 110 is no longer null due to Thread 3. Accordingly, Thread 4 may return/exit from process 200. Such returning/exiting from process 200 is illustrated in FIG. 4 by Thread 4's arrow stopping at act 220.

Thread 5 may successfully execute atomic act 220, causing the pointer next(B) of element 120 to point to its address. Thus, after act 220 list 100' may be unaltered, and elements 110 and 120 may point to themselves. This resulting state of list 100' and elements 110/120 is conceptually illustrated in FIG. 4 immediately below the dotted line of act 220.

Continuing process 200, both Thread 3 and Thread 5 may perform act 230. After act 230, the pointers next(A) and next(B) of elements 110 and 120 may both point to the same location (e.g., element 310) as the list pointer ListP of list 100'. The resulting state of list 100' and elements 110/120 after act 230 is conceptually illustrated in FIG. 4 immediately below the uppermost dotted line of act 230.

Thread 3 may execute atomic act 240. Finding List P of list 100' being equal to the pointer next(A) of element 110, Thread 3 may change ListP to the location of element 110. This successful execution of atomic act 240 is illustrated in FIG. 4 by Thread 3's arrow stopping at act 240. The resulting state of new list 100" (including elements 110 and 310) and element 120 after atomic act 240 is conceptually illustrated in FIG. 4 immediately below the uppermost dotted line of act 240.

Because Thread 5 cannot execute atomic act 240 concurrently with Thread 3 or otherwise interrupt Thread 3's execution of atomic act 240, Thread 5 may execute act 240 slightly afterward. Thread 5 may find in act 240 that List P of list 100' is not equal to the pointer next(B) of element 120 due to the prior execution of atomic act 240 by Thread 3. Accordingly, Thread 5 may return to act 230 to try again to add element 120 to list 110". Such returning to act 230 is illustrated in FIG. 4 by Thread 5's arrow continuing beyond the uppermost dotted line of act 240 to the lowermost line of act 230.

Thread 5 may perform act 230 again. After act 230, the pointer next(B) of element 120 may point to the same location (e.g., element 110) as the list pointer ListP of list 100". The resulting state of list 100" and element 120 after act 230 is conceptually illustrated in FIG. 4 immediately below the lowermost dotted line of act 230.

Thread 5 may execute atomic act 240 again. Finding List P of list 100" being equal to the pointer next(B) of element 120, Thread 5 may change ListP to the location of element 120. This second time executing act 240, Thread 5 does not encounter a ListP that was changed by another thread. This successful execution of atomic act 240 is illustrated in FIG. 4 by Thread 5's arrow stopping at the lowermost act 240. The resulting state of new list 100" (including elements 110, 120, and 310) after atomic act 240 is conceptually illustrated in FIG. 4 immediately below the lowermost dotted line of act 240.

With regard to the example in FIG. 4, the following characteristics of process 200 may be noted. Act 210 may provide an efficient mechanism for checking whether an element is already in list 100. Atomic act 220 may resolve contention among two or more threads seeking to add the same element to list 100. Atomic act 240 may ensure that a concurrent update of list 100 by a number of threads is performed correctly.

Further, process 200 may be tolerant of faults and may not produce deadlocks regardless of whether threads are suspended or killed. Atomic acts 220 and 240, at least conceptually, reduce lock time to essentially zero, because atomic acts are assumed to be instantaneous/uninterruptible-. Also, act 240, when it repeats acts 230 and 240 for some thread that was unable to add its element, may modify the position in list 100 of another element that was just added by another concurrent thread.

FIG. 5 illustrates one implementation of process 200 consistent with the principles of the invention. Routine/program 500 may add an element e of type eType to a list. Instructions 510, 520, 530, and 530 may correspond to acts 210, 220, 230, and 240, respectively. The "return" instructions in numbered lines 3, 6, and 11 of routine/program 500 in FIG. 5 may correspond to act 250.

The atomic operations of acts 220 and 240 may be performed by "compare and exchange" type atomic instructions 520 and 540. Computing environments may provide an API, CompareAndExchange (or a similar atomic primitive) that has the following characteristics. The API may include three arguments CompareAndExchange (dst, new, cmp) and may perform the following operations atomically. It may compare a content of the destination (dst) with a value of the comparand (cmp). If dst and cmp are equal, then CompareAndExchange may store the third value, new, to the destination, dst. Otherwise, CompareAndExchange may not modify the destination, dst. In either event, CompareAndExchange may return the initial value of the destination, dst. In this manner, an atomic instruction similar to CompareAndExchange may be used to implement acts 220 and/or 240.

Certain aspects of implementations of the claimed invention may be implemented using hardware, software, or a combination thereof and may be implemented in one or more computer systems or other processing systems. In fact, in one implementation, methods described herein may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code may be applied to the data entered using the input device to perform the functions described and to generate output information. The output information may be applied to one or more output devices.

One of ordinary skill in the art may appreciate that implementations consistent with the principles of the invention may be practiced with various computer system configurations, including multiprocessor systems, minicomputers, mainframe computers, and the like. Implementations consistent with the principles of the invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled and/or interpreted.

Program instructions may be used to cause a general-purpose or special-purpose processing system that is programmed with the instructions to perform the methods described herein. Alternatively, the methods may be performed by specific hardware components that include hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods.

The term "machine readable medium" or "machine accessible medium" used herein may include any medium that is capable of storing or encoding a sequence of instructions for execution by the machine and that causes the machine to perform any one of the methods described herein. The terms "machine readable medium" and "machine accessible medium" accordingly may include, but may not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating that the execution of the software by a processing system may cause the processor to perform an action or produce a result.

The foregoing description of one or more implementations consistent with the principles of the invention provides illustration and description, but is not intended to be exhaustive or to limit the claimed invention to the precise form disclosed. Modifications and variations are possible in light of the above teachings or may be acquired from practice of the invention.

For example, the principles of the invention described herein may be applied to data structures other than linked lists, and to operations other than adding an element to the data structure.

Moreover, the acts in FIG. 2 need not be implemented in the order shown; nor do all of the acts necessarily need to be performed. Also, those acts that are not dependent on other acts may be performed in parallel with the other acts. Further, the acts in this figure may be implemented as instructions, or groups of instructions, implemented in a computer-readable medium.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the claimed invention is defined by the claims and their equivalents.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether an element is associated with a data structure responsive to a request to insert the element into the data structure, and responsive to determining that the element is associated with the data structure, not inserting the element into the data structure;
   determining an additional time whether the element is associated with the data structure via an uninterruptible operation and atomically associating the element with the data structure responsive to determining the additional time that the element is not associated with the data structure, by causing the element to point to itself, and responsive to determining that the element is associated with the data structure not inserting the element into the data structure;
   preparing the element for insertion into a location in the data structure by causing the element to point to a value of a pointer of the data structure; and
   determining whether another element has been inserted into the location in the data structure and thereafter atomically inserting the element into the location in the data structure responsive to determining that the another element has not been inserted into the location, and responsive to determining that the another element has been inserted into the location not inserting the element into the data structure.

2. The method of claim 1, wherein the atomically associating is performed after the determining and includes:
   ascertaining whether the element is associated with the data structure, and associating the element with the data structure if the ascertaining determines that the element is not associated with the data structure.

3. The method of claim 1, wherein the preparing includes:
   pointing the element toward the location in the data structure.

4. The method of claim 1, further comprising:
   repeating the preparing the element for insertion and the atomically inserting the element if another element has been inserted into the location.

5. The method of claim 1, further comprising:
   continuing to add elements to the data structure if an executing thread among two or more executing threads is suspended or killed at any point in the method.

6. The method of claim 1 wherein the atomically associating, the preparing, and the atomically inserting are based on a field in the element that points to a next element in the data structure.

7. The method of claim 1, wherein the element is enforced to be present in the data structure only once.

8. The method of claim 1, wherein determining whether the element is associated with the data structure comprises determining whether a pointer of the element is a predetermined value.

9. A non-transitory article of manufacture, comprising:
   a storage medium having instructions stored thereon that, when executed by a computing platform, may result in addition of an element to a list by:
   checking whether the element already exists in the list, and if so, not inserting the element into the list;
   performing an uninterruptible operation to associate the element with the list if the checking determines that the element does not already exist in the list, the uninterruptible operation including:
   determining an additional time whether the element is already associated with the list, and atomically associating the element with the list responsive to determining that the element is not already associated with the list, and responsive to determining that the element is associated with the list not inserting the element into the list;
   preparing the element for insertion into a location in the list by causing the element to point to a value of a pointer of the list; and
   atomically inserting the element into the list, including pointing the element to a target element in the list, and performing another uninterruptible operation to insert the element into the list if the target element in the list has not changed, including determining via another uninterruptible operation whether the target element in the list has changed, and pointing the list to the element responsive to determining that the target element in the list has not changed, and responsive to determining that the target element is in the list has changed not inserting the element into the list.

10. A system comprising:
    a processor;
    a storage medium coupled to the processor including instructions executable by the processor to:
    determine whether an element is associated with a data structure responsive to a request to insert the element into the data structure, and if the element is associated with the data structure, not insert the element into the data structure;
    determine an additional time whether the element is associated with the data structure via an uninterruptible operation and atomically associate the element with the data structure responsive to determining the additional time that the element is to not associated with the data structure by causing the element to point to itself and responsive to determining that the element is associated with the data structure not insert the element into the data structure;

prepare the element for insertion into a location in the data structure by causing the element to point to a value of a pointer of the data structure; and determine whether another element has been inserted into the location in the data structure and thereafter atomically insert the element into the location in the data structure responsive to determining that the another element has not been inserted into the location, and responsive to determining that the another element has been inserted into the location not insert the element into the data structure.

11. The system of claim 10, wherein the atomically associating is performed after the determining and includes:

ascertaining whether the element is associated with the data structure, and associating the element with the data structure if the ascertaining determines that the element is not associated with the data structure.

12. The system of claim 10, wherein the atomically inserting includes:

determining whether another element has been inserted into the location in the data structure, and inserting the element into the location by pointing the data structure toward the element the determining determines that another element has not been inserted into the location.

13. The system of claim 10, wherein the element is enforced to be present in the data structure only once.

14. The system of claim 10, wherein the instructions further enable the processor to determine whether the element is associated with the data structure based on whether a pointer of the element is a predetermined value.

\* \* \* \* \*